United States Patent
Subbaian et al.

(10) Patent No.: US 9,842,281 B2
(45) Date of Patent: Dec. 12, 2017

(54) SYSTEM FOR AUTOMATED TEXT AND HALFTONE SEGMENTATION

(71) Applicant: Xerox Corporation, Norwalk, CT (US)

(72) Inventors: Sudhagar Subbaian, Tamilnadu (IN); Sainarayanan Gopalakrishnan, Chennai (IN); Xing Li, Webster, NY (US); Clara Cuciurean-Zapan, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 482 days.

(21) Appl. No.: 14/296,553

(22) Filed: Jun. 5, 2014

(65) Prior Publication Data

US 2015/0356740 A1 Dec. 10, 2015

(51) Int. Cl.
G06K 9/34 (2006.01)
G06K 9/62 (2006.01)
G06K 9/00 (2006.01)
G06K 9/46 (2006.01)

(52) U.S. Cl.
CPC ....... G06K 9/6267 (2013.01); G06K 9/00456 (2013.01); G06K 9/4638 (2013.01)

(58) Field of Classification Search
USPC ............ 1/1; 235/382; 345/440, 505; 348/42, 348/448; 358/1.9, 1.11, 2.1, 3.07, 406, 358/462; 382/128, 161, 164, 165, 170, 382/173, 176, 178, 182, 198, 205, 209, 382/254
See application file for complete search history.

(56) References Cited

U.S. PATENT DOCUMENTS

| | | | | |
|---|---|---|---|---|
| 4,590,606 A | * | 5/1986 | Rohrer | H04N 1/40062 358/406 |
| 4,610,025 A | * | 9/1986 | Blum | G06K 7/143 380/1 |
| 4,677,482 A | * | 6/1987 | Lewis, Jr. | H04N 7/012 348/448 |
| 4,817,166 A | * | 3/1989 | Gonzalez | G06K 9/3258 382/105 |
| 5,583,949 A | * | 12/1996 | Smith | G06K 9/481 382/199 |
| 5,850,474 A | | 12/1998 | Fan et al. | |
| 5,892,843 A | * | 4/1999 | Zhou | G06K 9/00442 358/462 |
| 6,081,621 A | * | 6/2000 | Ackner | G06K 9/186 382/209 |
| 6,157,738 A | * | 12/2000 | Wang | G06K 9/00449 382/198 |

(Continued)

*Primary Examiner* — Xuemei Chen
(74) *Attorney, Agent, or Firm* — Jones Robb, PLLC (57) ABSTRACT

A method and system for segmenting text from non-text portions of a digital image using the size, solidity, and run length characteristics of connected components within the image data. For a connected component comprising a rectangular group of pixels enclosing a set of connected pixels having the same binary state, the size characteristic may be based on a ratio of height to width of the connected component and the total number of pixels within the connected component, the solidity characteristic may be based on a ratio of pixels within the connected component to a total number of pixels within a convex hull of the set of connected pixels, and the run length characteristic may be based on a number of transitions within the connected component.

15 Claims, 4 Drawing Sheets

(56) References Cited

U.S. PATENT DOCUMENTS

| | | | | |
|---|---|---|---|---|
| 6,185,329 | B1 | 2/2001 | Zhang et al. | |
| 6,516,091 | B1 | 2/2003 | Nagarajan et al. | |
| 6,690,821 | B2 * | 2/2004 | Goldberg | G06K 9/6828 382/161 |
| 6,738,517 | B2 * | 5/2004 | Loce | G06K 9/00456 382/165 |
| 6,826,305 | B2 * | 11/2004 | Zhu | G06K 9/00456 382/170 |
| 6,842,537 | B2 | 1/2005 | Nicolas et al. | |
| 7,362,901 | B2 * | 4/2008 | Walch | G06K 9/00154 382/186 |
| 7,522,771 | B2 * | 4/2009 | Sutanto | G06K 9/00416 382/203 |
| 7,574,048 | B2 * | 8/2009 | Shilman | G06F 3/04883 345/156 |
| 7,724,958 | B2 * | 5/2010 | Walch | G06K 9/00161 382/116 |
| 7,865,017 | B2 * | 1/2011 | Rasmussen | G06K 9/00402 382/100 |
| 7,894,683 | B2 * | 2/2011 | Nagarajan | G06K 9/00456 358/3.07 |
| 7,903,876 | B2 * | 3/2011 | Zandifar | G06K 9/32 382/176 |
| 8,009,928 | B1 * | 8/2011 | Manmatha | G06K 9/325 382/173 |
| 8,189,917 | B2 | 5/2012 | Campbell | |
| 8,254,694 | B2 * | 8/2012 | Li | G06T 7/0085 382/205 |
| 8,285,035 | B2 * | 10/2012 | Malik | H04N 1/40062 382/164 |
| 8,285,077 | B2 * | 10/2012 | Fero | G06K 9/3275 382/276 |
| 8,346,483 | B2 * | 1/2013 | Kil | G01N 1/06 702/19 |
| 8,351,691 | B2 * | 1/2013 | Chen | G06K 9/00456 358/1.9 |
| 8,355,578 | B2 * | 1/2013 | Sohma | G06K 9/00469 382/176 |
| 8,396,256 | B2 * | 3/2013 | Lu | G06T 1/20 345/505 |
| 8,462,394 | B2 * | 6/2013 | Fan | H04N 1/40062 235/382 |
| 8,649,600 | B2 * | 2/2014 | Saund | G06K 9/00449 382/175 |
| 8,818,047 | B2 * | 8/2014 | Simske | G06K 9/18 382/112 |
| 8,818,099 | B2 * | 8/2014 | Tian | G06K 9/346 382/176 |
| 8,824,822 | B2 * | 9/2014 | Lei | H04N 1/38 382/254 |
| 8,942,441 | B2 * | 1/2015 | Nielsen | G06K 9/0014 382/128 |
| 8,947,736 | B2 * | 2/2015 | Yu | H04N 1/40062 358/1.11 |
| 9,042,649 | B2 * | 5/2015 | Tian | G06T 7/0081 382/173 |
| 9,043,349 | B1 * | 5/2015 | Lin | G06K 9/18 382/257 |
| 9,076,056 | B2 * | 7/2015 | Wang | G06K 9/18 |
| 9,098,888 | B1 * | 8/2015 | Lin | G06K 9/18 |
| 9,098,946 | B2 * | 8/2015 | Sato | H04N 1/448 |
| 9,165,406 | B1 * | 10/2015 | Gray | G06K 9/00456 |
| 9,171,204 | B2 * | 10/2015 | Acharya | G06K 9/3283 |
| 9,235,757 | B1 * | 1/2016 | Liu | G06K 9/325 |
| 9,256,795 | B1 * | 2/2016 | Gray | G06K 9/2054 |
| 9,418,283 | B1 * | 8/2016 | Natarajan | G06K 9/00463 |
| 9,424,488 | B2 * | 8/2016 | Simske | G06K 9/6221 |
| 2009/0172002 | A1 * | 7/2009 | Ahmed | G06F 17/30011 |
| 2012/0206567 | A1 * | 8/2012 | Zafarifar | H04N 7/025 348/42 |
| 2013/0050764 | A1 * | 2/2013 | Zhan | H04N 1/403 358/2.1 |
| 2014/0152665 | A1 * | 6/2014 | Lu | G06T 11/206 345/440 |
| 2015/0042287 | A1 * | 2/2015 | Liu | B60L 11/182 320/134 |
| 2015/0086113 | A1 * | 3/2015 | Chattopadhyay | G06K 9/342 382/178 |
| 2015/0178563 | A1 * | 6/2015 | Galleguillos | G06F 17/30011 382/218 |
| 2015/0302255 | A1 * | 10/2015 | Gershtein | G06K 9/00 382/128 |
| 2015/0339536 | A1 * | 11/2015 | Lin | G06K 9/18 382/182 |
| 2016/0063355 | A1 * | 3/2016 | Reese | G06K 9/00422 382/182 |

* cited by examiner

SYSTEM FOR AUTOMATED TEXT AND HALFTONE SEGMENTATION

TECHNICAL FIELD

The present invention is directed to systems and methods for automated segmentation of text regions from pictorial regions within scanned images.

BACKGROUND

Digital imaging devices such as copiers, scanners and other reproduction and display devices often employ automatic segmentation techniques to identify text regions within document image data. Accurate segmentation of text regions and non-text regions is critical for a number of processing operations performed by digital imaging devices including image compression performance, optical character recognition (OCR) processing, extraction of data or information from forms, and rescreening. It is desirable that a segmentation method operate on a range of image data types including halftones and minimize introduction of image artifacts Additionally, it is desirable that an implementation of the segmentation processing should be fast enough to permit real-time processing without requiring special hardware or application specific integrated circuit or other specialized hardware.

PRIOR ART

An number of automatic segmentation techniques and operations have been implemented. For example, U.S. Pat. No. 8,189,917 B2 "Methods and systems for locating text in a digital image" discloses methods and systems for locating text characters in an image by dividing a multilevel image into a plurality of blocks and classifying each block as a text block or a non-text block based on one or more parameters associated with the block. Use of the methods and systems disclosed in U.S. Pat. No. 8,189,917 B2 have the possibility of rectangular artifacts.

U.S. Pat. No. 6,842,537 B2 "Text Detection" discloses a method of detecting text in a video signal wherein high horizontal frequencies in the video signal are detected to obtain horizontal edge detection results, and horizontal edge detection results at a given position are correlated with horizontal edge detection results at vertically neighboring positions. The method operates on video signals and is not suitable for halftone image segmentation.

U.S. Pat. No. 6,516,091 B1 "Block level analysis of segmentation tags" discloses a system for processing segmentation tags to generate a block level tag representative of a group of segmentation tags. The system includes first and second statistic compilation circuits, each of the compilation circuits being connected to receive segmentation tags and compile a statistic for a plurality of the received segmentation tags. An address controller connected to the first and second statistic compilation circuits operates to select one of the first and second compilation circuits to receive the segmentation tags. The system is designed for ASIC implementation and generally too computationally complex for real time software implementation.

U.S. Pat. No. 6,185,329 B1 "Automatic caption text detection and processing for digital images" discloses a texture-based text localization system that proceeds directly in the compressed domain for DCT compressed JPEG images or MPEG videos. The DCT coefficient values in JPEG images and MPEG videos, which capture the directionality and periodicity of local image blocks, are used as texture feature measures to classify text areas. Each unit block in the compressed images is classified as either text or non-text. In addition, post-processing in both the compressed domain and the reconstructed candidate text areas can be used to refine the results. For video frames that contain text, the displacement of text between two consecutive frames is estimated which gives the velocity of the moving text. This temporal displacement information is also used to further refine the localization results. The text is then processed to provide content or speech output. The system operates on JPEG images and MPEG videos but does not contemplate halftone patterns which are commonly found in printed documents.

U.S. Pat. No. 5,850,474 "Apparatus and method for segmenting and classifying image data" discloses a method and apparatus for segmenting image data into windows and for classifying the windows as typical image types includes making two passes through the image data. The method includes a step of making a first pass through the image data to identify windows and to record the beginning points and image types of each of the windows, and a step of making a second pass through the image data to label each of the pixels as a particular image type. The invention also includes a macro-detection method and apparatus for separating a scanline of image data into edges and image runs and for classifying each of the edges and image runs as standard image types. In the macro-detection method, image runs and edges are classified based on micro-detection results and based on image types of adjacent image runs. The system is designed for ASIC implementation and generally too computationally complex for real time software implementation.

SUMMARY

According to aspects of the present disclosure, a method for separation of text and halftone regions of a scanned document image is provided. The method includes scanning a document to obtain scanned image data representing the document and generating a binary image from the scanned image data, identifying a connected component comprising a group of pixels enclosing a set of connected ON pixels and determining at least two of a size label, a solidity label, and run length label for the connected component, wherein each of the size label, the solidity label, and the run length label identifies the connected component as being either a text area or a non-text area, and where the connected component corresponds to a text component if at least two of the size label, the solidity label, and the run length label identify the connected component as being a text component.

According to another aspect of the present disclosure, a system for automated text and halftone segmentation is provided. The system includes a scanner operable to scan a document and generate scanned image data representing the document and a processor operable to generate a binary image from the scanned image data, wherein the binary image comprises a two dimensional array of pixels; identify a connected component within the binary image, the connected component comprises a group of pixels enclosing a set of connected ON pixels; and determine a size label, a solidity label, and run length label for the connected component, wherein each of the size label, the solidity label, and the run length label identifies the connected component as being either a text area or a non-text area, and where the connected component corresponds to a text component if the size label, the solidity label, and the run length label identify the connected component as being a text component.

Yet a further aspect of the present disclosure, is a method of segmenting text from non-text portions of a digital image, comprising locating a connected component within digital image data corresponding to a document having a text region and a non-text region, where the connected component comprises a group of pixels enclosing a set of connected ON pixels; identifying a size label based on a ratio of height to width of the connected component and an area of the connected component; identifying a solidity label based on a ratio of pixels within the connected component to a total number of pixels within the convex hull of the contiguous group of pixels within the connected component; identifying a run length label is based on a number of transitions within the connected component, and classifying the connected component as the text region when each of the size label, the solidity label, and the run length label indicated that the connected component is a text area.

Other objects, features and advantages of one or more embodiments of the current disclosures will be readily apparent from the following detailed description, drawings and appended claims.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

For a general understanding of the present invention, reference is made to the drawings. In the drawings, like reference numerals have been used throughout to designate identical elements. In describing the present invention, the following term(s) have been used in the description:

A "scanner" is a device that captures images from a hardcopy medium and converts them to digital format. The term "scanner" includes any such device, whether flat-bed, hand-held, feed-in, and includes devices that capture images in color or only in black-and-white. Typically scanners move across an image in the "fast-scan" direction (also referred to as the "horizontal" direction) collecting data from a single line in the image, then take a step in the "slow-scan" direction, i.e., the direction normal to the fast-scan direction (also referred to as the "vertical" direction), and collect data from the next line in the image.

A "pixel" is the smallest unit of visual information that represents a corresponding area in an original image. A "pixel value" is a numerical value that indicates the color and/or intensity displayed at a pixel. A "scanline" is the visual information that represents image data from the same horizontal or vertical location across the original image. A "horizontal" scanline includes image data for pixels from a single location in the fast-scan direction while a vertical scanline includes image data selected across several lines in the fast-scan direction at a common a vertical pixel location.

"Data" refers to physical signals that indicate or include information. Data is typically processed by a set of instructions, such as a software program or application, to generate output. The term "data" includes data existing in any physical form, and includes data that are transitory or are in the process of being stored or transmitted. For example, data could exist as electromagnetic or other transmitted signals or as signals stored in electronic, magnetic, or other form. For example, a binary item of data, also referred to as a "bit," has one of two values, interchangeably referred to as "1" and "0" or "ON" and "OFF" or "high" and "low."

An "image" is generally a pattern of physical light that may include characters, words, and text as well as other features such as graphics. An entire image is typically represented by a plurality of pixels. "Image data" refers to information that represents an image. "Grayscale image data" refers to image data that represents and black and white and/or color images using multiple luminance levels.

Figure 1:
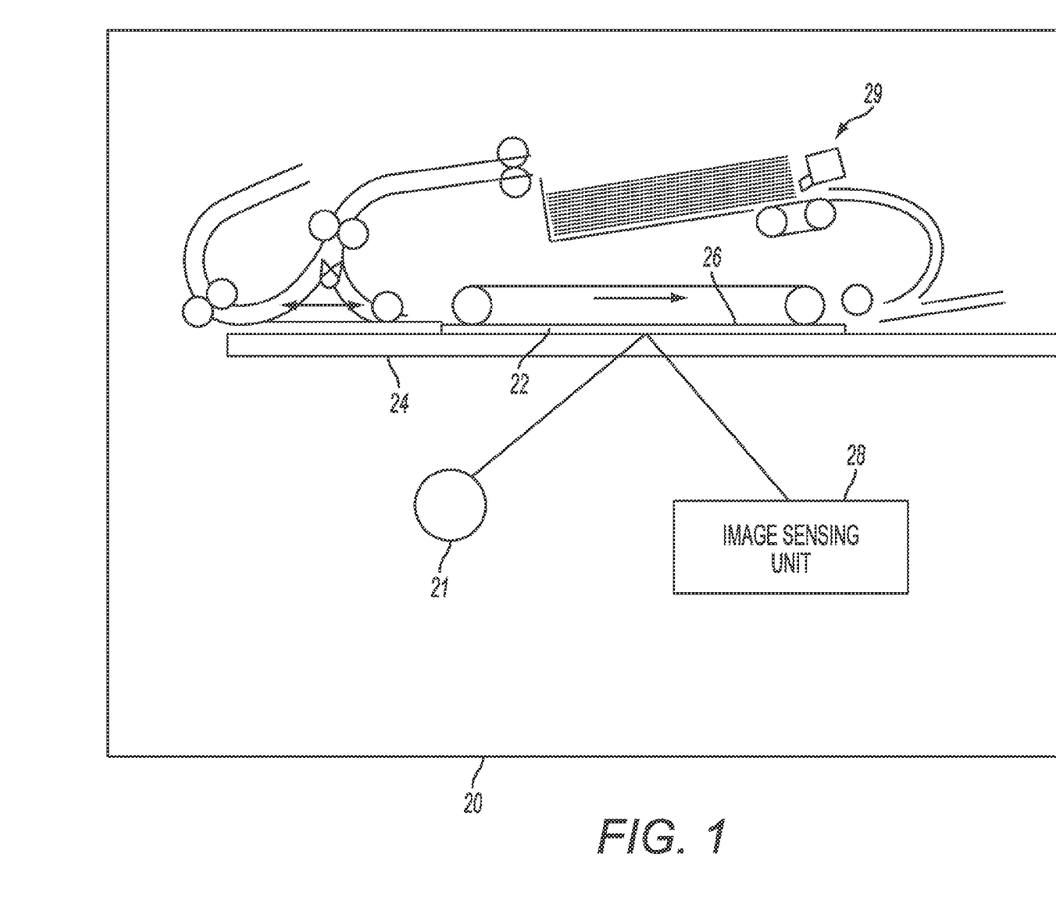
FIG. 1 is a diagram illustrating components of an exemplary digital scanner.

FIG. 1 illustrates components of an exemplary scanning unit 20 of a digital scanner. In the scanning unit 20, a light source 21 is used to illuminate a document 22 to be scanned. In a platen-type scanning situation, the document 22 usually rests upon a glass platen 24, which supports the document 22 for scanning purposes. The document 22 may be placed on the glass platen 24 by an operator. Alternatively, the scanning unit may include a feeder or document handler 29, which places the document on the glass 24.

On top of the glass platen 24 and the document 22, a backdrop portion (platen cover) 26 is placed to prevent stray light from leaving the scanning area to provide a background from which an input document can be distinguished. The backdrop portion 26 may be part of document handler 29. The backdrop portion 26 is the surface or surfaces that can be scanned by an image-sensing unit 28 when a document is or is not present in the scanning station. The light reflected from the document passes through a lens subsystem (not shown) so that the reflected light impinges upon the image sensing unit 28, such as a charge coupled device (CCD) array or a full width array.

A full width array typically comprises one or more linear arrays of photo-sites, wherein each linear array may be sensitive to one or more colors. In a color image capture device, the linear arrays of photo-sites are used to produce electrical signals which are converted to color image data representing the scanned document. However, in a black-and-white scanner, preferably, only one linear array of photo-sites is used to produce the electrical signals that are converted to scanned image data representing the image of the scanned document.

Figure 2:
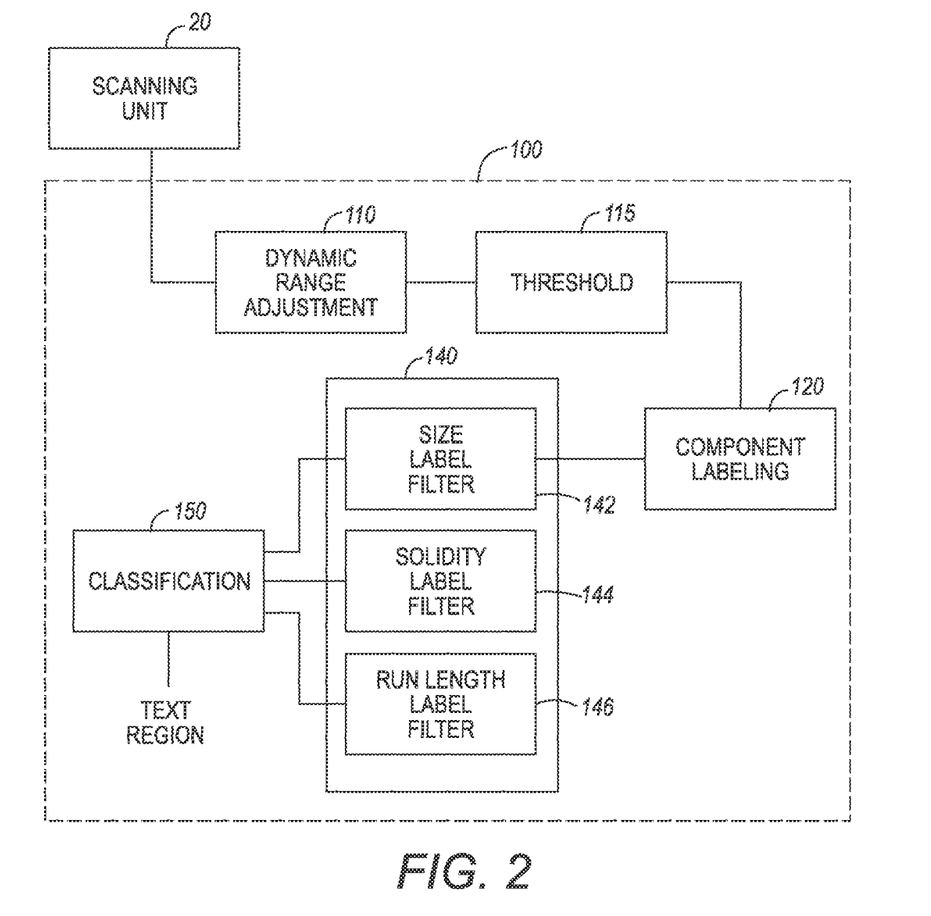
FIG. 2 illustrates a block diagram of an exemplary embodiment of a system for text and halftone segmentation.

Turning to FIG. 2, there is shown a block diagram of an exemplary embodiment of a system 100 for automated text and halftone segmentation. As shown in FIG. 2, system 100 includes a scanning unit 20, a dynamic range adjustment module 110, a threshold module 115, a connected component identification module 120, a component labeling module 140 and a classification module 150. It should be understood that the automated text and halftone segmentation system 100 may be a separate unit or an integrated component of an image processing or image forming device.

As shown in FIG. 2, the dynamic range adjustment module 110 receives scanned image data from scanning unit 20. The dynamic range adjustment module 110 processes the received data and performs background suppression and dynamic range adjustment processing on the image data. It should be understood that any known or hereafter developed method for background suppression and dynamic range adjustment processing may be used in various exemplary embodiments disclosed herein such as those described in U.S. Pat. Nos. 6,618,171; 7,421,143; and 8,000,554, the teachings each of which are incorporated herein by reference.

Briefly, automatic background suppression is used to detect the background value of the image data and to automatically suppress the background. Background detection is performed by analyzing statistics from a portion of a document, such as the lead edge, where a group of scan lines are collected to generate a histogram for the input document; however, full page background detection results can be used to further improve the quality of the reproduced image. Using the histogram, the white point and the black point of the image may be determined. It should be understood that the black point and the white point for the scanned image may be determined based on any known or later developed method for determining the black point and the white point, respectively. For example, the white point of the image may be determined based on the portion of the histogram which identifies an intensity level of a majority of the pixels of the image or on the shape of the white peak of the histogram. The black point may be determined based on the bin number at which the accumulation starting from exceeds a certain threshold value.

The determined white point and black point of the scanned image data may then be used to determine a gain factor using any known or later developed methods for determining a gain factor. For example, the determined white point for the scanned image data and the offset value determined from the black point for the scanned image data may be used to determine the gain factor for the scanned image data. The gain factor may be used to compensate for the background of the scanned image data. After the scanned image data is processed by dynamic range adjustment module 110, the data is converted from a multilevel or grayscale image to binary image data at a threshold module 115 using any known or later developed thresholding techniques. For example, with conventional thresholding techniques, a threshold can be calculated from histogram data collected over the entire image or a relevant portion thereof and each pixel within the image, or such relevant portion, is compared to the threshold value to generate a binary value for the pixel.

The connected component identification module 120 operates on the binary image data to identify connect components within the image data. A connected component comprises the rectangular block of pixels that surrounds a contiguous group of binary pixels having the same state. Various techniques exist to identify a contiguous group of binary pixels having the same state from binary image data and any of these know or later developed techniques. In the simplest form, the identification of a contiguous group of binary pixels having the same state traverses a first scanline and identifies runs of pixels having the same state within that first scanline. The method then steps to the next scanline and identifies runs of pixels within that second scanline. A run of pixels from the second scanline that overlaps with a pixel run identified in the previous scanline are combined into to create a contiguous group. The contiguous group is closed when a run of pixels that overlaps the group is not found.

Component labeling module 140 operates on the connected components identified by module 120 to determine a size label, a solidity label, and run length label for the connected component. Component labeling module 140 includes a size label filter 142, a solidity label filter 144, and run length label filter 146 to identify the size, solidity, and run length labels, respectively, for each of the connected components received. Each of the size label, the solidity label, and the run length label identifies the associated connected component as being either a text component or a non-text component based on size, solidity, and run length statistics calculated for the given connected component. With a multi-core architecture, the size label filter 142, solidity label filter 144, and run length label filter 146 can operate in parallel to calculate the size, solidity, and run length statistics and generate the labels for connected components. The operation of component labeling module 140 can be further optimized using vector processors.

More particularly, size label filter 142 calculates two statistics, a size ratio (R) equal to the ratio of the height and width of the associated connected component and the area (A) equal to the total number of pixels within the connected component. The filter generates a size label (ISI) for the connected component that identifies the component as a text component if the size ratio is between an upper and a lower ratio threshold and the area is between an upper and a lower area threshold.

Solidity label filter 144 calculates a solidity value S calculated as the ratio of the area to the convex area. The area (A) is the total number of pixels in the connected component as calculated for the size label. The convex area is the number of pixels within the convex hull of the contiguous group of pixels within the connected component. Solidity label filter 144 generates a solidity label (ISO) for the connected component that identifies the component as a text component if the solidity value is greater than a solidity threshold Ts.

Run length label filter 146 operates to determine a number of scanlines that meet a run length condition. The filter identifies a set of horizontal scanlines and vertical scanlines sampled from across the associated connected component based on the resolution of the scanning and size of the connected component. For each scanline within the set, a run length vector, $R_{LH}$ for a horizontal scanline and $R_{LV}$ for a vertical scanline is generated. For each run length vector RLH or RLV, the difference of length of the vector (LH or LV) and the number elements within that vector that exceed a threshold length (KH or KV) is calculated. The difference is compared to a function of the size ratio (R) for the connected component. For vertical scanlines the difference is compared to a multiple of the size ratio, while for horizontal scanlines the difference is compared to a multiple of the inverse of the size ratio, i.e., (LV−KV>A*R) and (LH−KH>A/R). Run length label filter 146 generates a run length label (IRL) for the connected component identifying the component as a text component when the number of scanlines meeting the run length condition wherein the difference between the vector length and threshold elements exceeds a function of the size ratio exceeds a percentage μ of the scanlines within the set.

The size label $I_{SI}$, solidity label $I_{SO}$, and run length label IRL for the connected component are provided to classification module 150. Classification module 150 analyzes the size, solidity and run length labels associated with a given connected component and classifies that component as a text area if each of the labels $I_{SI}$, $I_{SO}$, and $I_{RL}$ identifies the connected component as being a text component. In addition, classification module 150 further compiles the classifications of multiple connected components to combine multiple text components into one or more text areas.

Figure 3:
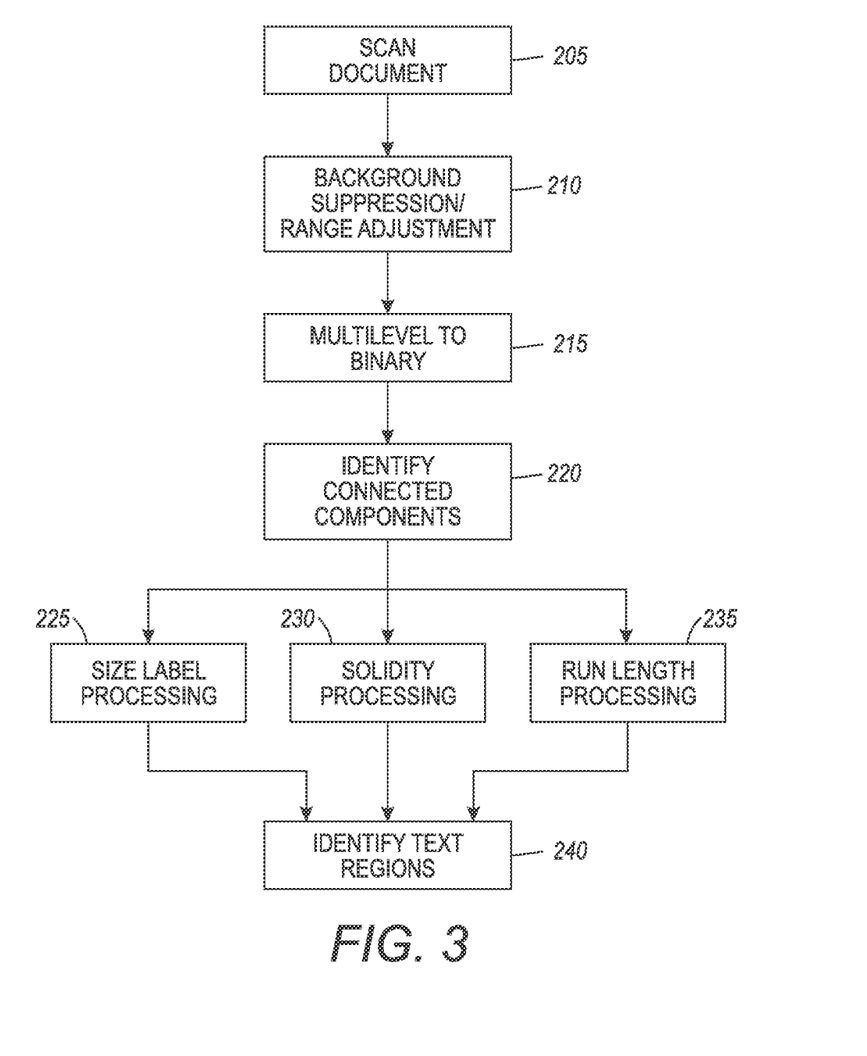
FIG. 3 is a block flow diagram of the operation of a system for segmenting a text region from a pictorial region within a scanned image.

Referring to FIG. 3 there is shown a block flow diagram of the operation of a system for segmenting a text region from a pictorial region within a scanned image. The description of FIG. 3 will be made with additional reference to FIG. 4 which illustrates several connected components that may be identified by a connected component identification operation performed in a method or system for segmenting a text region from a pictorial region within a scanned image.

In FIG. 3, the a block flow diagram of the operation of the system begins at step 205 where a document is scanned to generate a scanned image data and proceeds to step 210. At step 210 background suppression and dynamic range adjustment processing is performed on the scanned image data to generate adjusted scanned image data which is passed to step 215. Briefly, the processing at step 210 includes a white point detection operation, a black point detection operation, and a gain factor calculation used to compensate for the background of the scanned image data. At step 215 the adjusted scanned image data is converted from multilevel or grayscale image data to binary image data using any known or later developed thresholding technique. Next the binary image data is processed at step 220 where the binary data is examined as it arrives to identify connected components within the binary image data.

Figure 4:
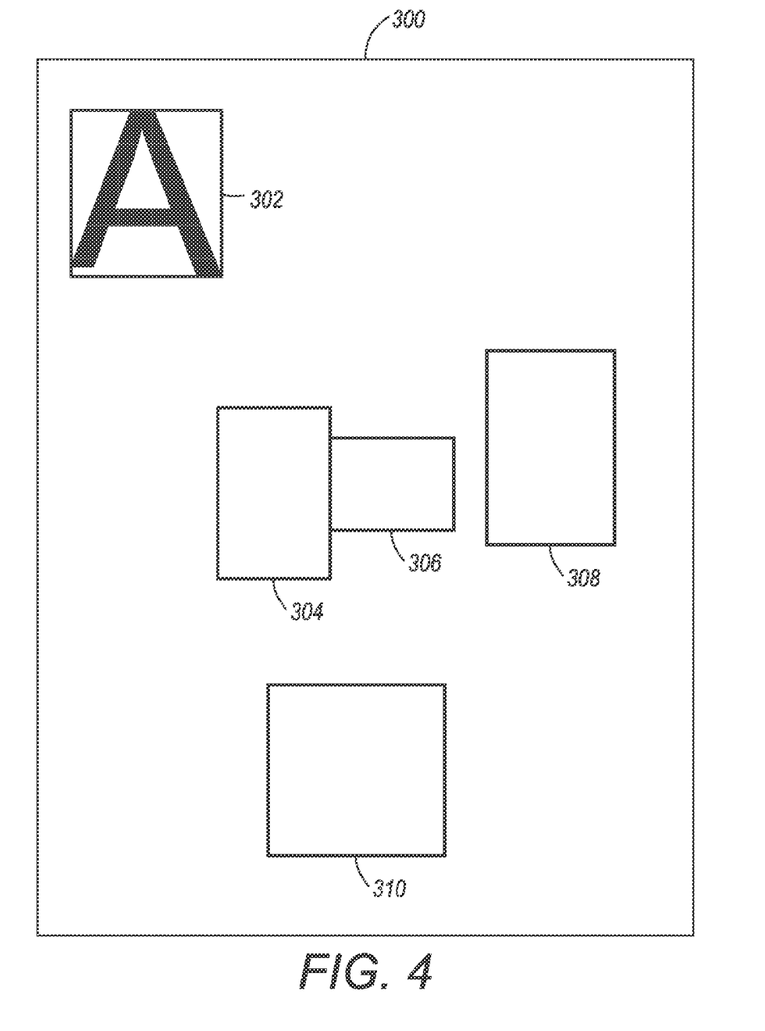
FIG. 4 illustrates connected components that may be identified by a connected component identification operation performed in a method or system for segmenting a text region from a pictorial region within a scanned image.

FIG. 4 illustrates several connected components that may be identified by a connected component identification operation such as performed at step 220. As shown in FIG. 4, with particular reference to connected component 302 within document 300, the connected component comprises the block of pixels that surrounds a contiguous group of binary pixels having the same state as represented by the letter "A" in connected component 302.

The connected components identified at step 220 are passed to size processing step 225, solidity processing step 230, and run length processing step 235. Size processing step 225, solidity processing step 230, and run length processing step 235 operate on the binary image data comprising each connected component to identify the size, solidity, and run length labels, respectively, for each of the connected components received. Each of the size label, the solidity label, and the run length label identifies the associated connected component as being either a text component or a non-text component based on size, solidity, and run length statistics calculated for the given connected component.

Each step 225, 230, and 235 can receive a block of binary image data corresponding to the connected component along with a reference index number or other label that uniquely identifies each connected component. As an alternative to passing a block of image data, step 220 can identify the location of the component by passing a reference location, such as the position of a corner, along with an horizontal and vertical offset identifying the height and width of the connected component. Identifying each connected component with a unique reference index number or other label enables steps 225, 230, and 235 to process the connected components independently and subsequently combine the results from steps 225, 230, and 235 at step 240. For purposes of discussion, assume that step 220 identifies N connected components with each connected component identified using a an index number (x) that identifies the xth connected component.

At size processing step 225 two statistics, a size ratio $R(x)$ equal to the ratio of the height and width of the xth connected component and the area $A(x)$ equal to the total number of pixels within the xth connected component, are calculated for each connected component. Step 225 uses these statistics to generates a size label $I_{SI}(x)$ for each connected component that identifies that connected component as a text component if the ratio is between an upper and a lower ratio threshold and the area is between an upper and a lower area threshold. That is, the generation of the size labels can be expressed as:

$$I_{SI}(x) = \begin{cases} \text{text} & \text{if } T_{RH} > R(x) > T_{RL} \text{ and } T_{AH} > A(x) > T_{AL} \\ \text{non-text} & \text{otherwise} \end{cases}$$

where
$T_{RH}$ and $T_{RL}$ are the upper and lower thresholds for the size ratio R; and $T_{AH}$ and $T_{AL}$ are the upper and lower thresholds for the area A.

At solidity processing step 230 a solidity value $S(x)$ equal to the ratio of the area $A(x)$ to the convex area $ACH(x)$ is calculated for each connected component. Where $A(x)$ is the area of the xth connected component and $ACH(x)$ is equal to the number of pixels within the convex hull of the contiguous group of pixels within the xth connected component. Step 225 uses these solidity values to generates a solidity label $I_{SO}(x)$ for each connected component that identifies the associated component as a text component if the solidity value is greater than a solidity threshold $T_s$. That is, the generation of the solidity labels can be expressed as:

$$I_{SO}(x) = \begin{cases} \text{text} & \text{if } S(x) > T_S \\ \text{non-text} & \text{otherwise} \end{cases}$$

Run length processing step 235 operates to identify a set of horizontal scanlines and a set of vertical scanlines sampled from across the associated connected component and generate a run length vector for each. The number and position of the sample scanlines in horizontal and vertical direction are determined based on the resolution of the scanning and size of the label. For each run length vector the difference of length of the vector and the number elements within that vector that exceed a threshold is calculated. The difference is compared to a function of the size ratio (R) for the connected component. For vertical scanlines the difference is compared to a multiple of the size ratio, while for horizontal scanlines the difference is compared to a multiple of the inverse of the size ratio. Run length processing step 235 generates a run length $I_{RL}(x)$ for the xth connected component identifying that component as a text component when the total number of scanlines satisfying the run length condition of the difference between the vector length and threshold elements that is greater than function of the size ratio exceeds a fraction µ of the scanlines within the set.

More specifically, run length processing step 235 identify a set of N horizontal scanlines and a set of N vertical scanlines sampled from across the connected component. The number of sampled scanlines 'N' is selected between 1 to 10 based on the size of the label and resolution of the scanning with the sample scanlines being distributed evenly across component. With a set of N scanlines let RLV,n, be the run length vector of the nth vertical scanline within the set; let $L_{Vn}$ be the length of the run length vector RLV,n; and $K_{Vn}$ be the number of elements in the run length vector RL,Vn greater than length threshold TLN. Similarly, let RLH,n be the run length vector of the nth horizontal scanline; $L_{Hn}$ be the length of the nth horizontal run length vector RLH,n, and $K_{Hn}$ be the number of elements in run length vector RLH,n, greater than length threshold TLN.

Then the generation of the run length label $I_{RL}(x)$ for the xth connected component can be expressed as:

$$I_{RL}(x) = \begin{cases} \text{text} & \text{if } \left\{ \Sigma_1^N ((L_{Vn} - K_{Vn}) > A * R(x)) \& \left( (L_{Hn} - K_{Hn}) > \frac{A}{R(x)} \right) \right\} > \mu N \\ \text{non-text} & \text{otherwise} \end{cases}$$

where

A is a constant selected between '0' to '1' based on the scanning resolution and μ is a constant value between '0' to '1'.

The size, solidity and run length labels $I_{Sf}(x)$, $I_{SO}(x)$ and $I_{RL}(x)$ generated at steps 225, 230, and 235 are provided to step 240 where the set of labels associated with each connected component are analyzed to identify text regions. In particular, if each of the labels $I_{Sf}(x)$, $I_{SO}(x)$ and $I_{RL}(x)$ generated for a given component identifies that connected component as being a text, step 240 classifies that component as a text area. In addition, within step 240 the text areas combined to produce one or more text regions. That is, referring to FIG. 4, step 240, a single text region comprising components 302, 304, 306, 308 and 310 may be identified. Alternately, text regions may be assembled from text areas that neighbor or are within a given distance from each other such that step 240 would identify three text regions within document 300; a first text region comprising components 302, a second assembled from components 304, 306 and 308 and a third from 310.

It will be appreciated that the values for the various thresholds used the generation of the labels at 225, 230, and 235 are dependent on a number of factors including the fidelity of the scanned image data, resolution of the scanned image data, composition of the input document (e.g., halftones, pictorial, text on tints), expected text size, etc., and can be tuned for a given application. Step 225 exploits the principle that the letters and other characters that comprise text generally have an aspect ratio that falls within an expected range. Thus, the upper and lower thresholds $T_{RH}$ and $T_{RL}$ for the size ratio R are selected to meet this condition. Additionally, the area calculation of step 225, is used to eliminate components that meet the aspect ratio but are either too large or too small to be text. Step 230 employs the principle that for text components one expects a minimum coverage. That is, if the ratio of pixels within the connected component to the pixels within the convex area of the contiguous pixels within the connected component is too small, it is likely not text. Assuming a minheight of 8; minwidth of 8; maxheight of 350; and maxwidth of 350 for components, size ratio R thresholds $T_{RH}$ and $T_{RL}$ of 150 and 8, respectively, area thresholds $T_{AH}$ and $T_{AL}$ of maxheight*maxwidth and (minheight*minwidth)*0.80, respectively, and a solidity threshold Ts of about 0.3 can be used. Step 235 operates on the principle that halftones and text will exhibit different run length characteristics. It should be appreciated that the exemplary thresholds, ranges and values provided above are not the sole or exclusive values therefor and that such values should be tuned for a given scanner and scanning application.

It will be appreciated that variations of the above-disclosed features and functionality for segmentation of a text region from a non-text region within scanned image date may be implemented. For example, the solidity filter processing may be simplified to calculate a solidity value S as the ratio of the number of pixels within the connected component to the number of pixels comprising the contiguous set of connected pixels. Additionally, the run length filter processing may be simplified to identify and count the number of transitions that occur within a sample subset of horizontal and vertical scanlines selected from across the connected component. With this implementation, run length filter processing will also select a number of scanlines selected is a function of the size of the text box. The processing then calculates the number of transitions HT(x) within the subset of horizontal scanlines selected from the xth connected component and the number of transitions VT(x) within the subset of vertical scanlines sampled from the xth connected component. The run length label $I_{RL}(x)$ for the connected component can identify a component as a text component when the total number of transitions HT(x) is less than a horizontal transition threshold THT and the number of transitions VT(x) is less than a vertical transition threshold TVT. As should be readily appreciated, the transition thresholds THT and TVT differ based on the number of and the run length of the scanlines sampled. In one embodiment with binary image data resolution of 600×600 dpi, the subset of horizontal and vertical scanlines selected using one scanline for every 20 scanlines for each direction. Although these two alternatives are not as robust or precise as the processing described above, an alternative may be used to simplify processing and/or implementation.

The present disclosure thus describes and illustrates segmentation of a text region from a non-text region within scanned image date. It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for segmenting a text region from a pictorial region within a scanned image comprising:
   scanning a document to obtain scanned image data representing the document;
   generating a binary image from the scanned image data, wherein the binary image comprises a two dimensional array of pixels and where a value of a pixel comprises one of an ON value and an OFF value;
   identifying a connected component within the binary image, wherein the connected component comprises a group of pixels enclosing a set of connected pixels having the same value;
   determining a size label, a solidity label, and a run length label for the connected component, wherein:
   each of the size label, the solidity label, and the run length label identifies the connected component as being either a text component or a non-text component,
   the solidity label is based on a ratio of total number of pixels within the connected component to a number of pixels within a convex hull of the connected pixels within the connected component,
   the connected component is identified as a text component if the ratio is greater than a solidity threshold,
   the run length label is based on a function of a run length vector characteristic of each scanline within a set of scanlines and a ratio of a height to a width of the connected component, wherein the set of scanlines is sampled from scanlines across the connected component and for each scanline within the set the run length vector characteristic is determined as a difference of a number of elements within a run length vector for the scanline that exceed a threshold length and a length of the run length vector, and the connected component corresponds to a text component if each of the size label, the solidity label, and the run length label identifies the connected component as being a text component; and classifying the connected component as a text region within the scanned image when the connected component is identified as being a text component.

2. The method of claim 1, wherein the size label is based on a ratio of a height to a width of the connected component and an area of the connected component, where the connected component is labeled as a text component if the ratio is between an upper ratio threshold and a lower ratio threshold and the area is between an upper area threshold and a lower area threshold.

3. The method of claim 1, wherein the run length label is based on a number of transitions within a set of scanlines selected from scanlines across the connected component and where the connected component is labeled as a text component if the number of transitions is less than a transition threshold.

4. The method of claim 3, wherein the set of scanlines selected from scanlines across the connected component comprises a set of horizontal scanlines.

5. The method of claim 3, wherein the set of scanlines selected from scanlines across the connected component comprises a set of vertical scanlines.

6. The method of claim 3, wherein the set of scanlines selected from scanlines across the connected component comprises a set of horizontal scanlines and a set of vertical scanlines.

7. A system for segmenting a text region from a pictorial region within a scanned image comprising:
    a scanner operable to scan a document and generate scanned image data representing the document; and
    a processor operable to:
        generate a binary image from the scanned image data, wherein the binary image comprises a two dimensional array of pixels and where a value of a pixel comprises one of an ON value and an OFF value;
        identify a connected component within the binary image, wherein the connected component comprises a group of pixels enclosing a set of contiguous pixels having the same value;
        determine a size label, a solidity label, and a run length label for the connected component, wherein each of the size label, the solidity label, and the run length label identifies the connected component as being either a text component or a non-text component, wherein the solidity label is based on a ratio of total number of pixels within the connected component to a number of pixels within a convex hull of the connected pixels within the connected component, wherein the connected component is identified as a text component if the ratio is greater than a solidity threshold, and wherein the connected component corresponds to a text component if each of the size label, the solidity label, and the run length label identifies the connected component as being a text component; and
        identify a text region within the scanned image as an area of the scanned image that corresponds to a text component.

8. The system of claim 7 wherein the processor includes a multicore processor operable to determine the size label, the solidity label, and the run length label for multiple connected components in parallel.

9. The system of claim 7, wherein the size label is based on a ratio of a height to a width of the connected component and an area of the connected component, where the connected component is labeled as a text component if the ratio is between an upper ratio threshold and a lower ratio threshold and the area is between an upper area threshold and a lower an area threshold.

10. The system of claim 7, wherein the run length label is based on a number of transitions within a set of scanlines selected from scanlines across the connected component and where the connected component is labeled as a text component if the number of transitions is less than a transition threshold.

11. A method of segmenting text from non-text portions of a digital image, comprising:
    locating a connected component within digital image data corresponding to a document having a text region and a non text region, where the connected component comprises a group of pixels enclosing a set of connected ON pixels;
    identifying a size label based on a ratio of a height to a width of the connected component and an area of the connected component;
    identifying a solidity label based on a ratio of a number of pixels within the connected component to a number of pixels within a convex hull of connected pixels within the connected component;
    identifying a run length label based on a number of transitions within the connected component, wherein:
        the run length label is determined from a comparison of a run length vector characteristic of each scanline within a set of scanlines with a function of the ratio of height to width of the connected component and the area of the connected component,
        the set of scanlines is sampled from scanlines across the connected component and for each scanline within the set of scanlines the run length vector characteristic is determined as a difference of a number of elements within a run length vector for the scanline that exceed a threshold length and a length of the run length vector, and
        the run length vector characteristic is compared to one of a product of the height to width ratio and the area and a quotient of the height to width ratio and the area; and
    classifying the connected component as the text region when each of the size label, the solidity label, and the run length label indicates that the connected component is a text component.

12. The method of claim 11, wherein the size label indicates that the connected component is a text component when the ratio of the height to the width of the connected component is between an upper size threshold and a lower size threshold and the area is between an upper area threshold and a lower area threshold.

13. The method of claim 11, wherein the solidity label indicates that the connected component is a text component when the ratio of the number of pixels within the connected component to the number of pixels within the convex hull of connected pixels within the connected component is greater than a solidity threshold.

14. The method of claim 11, wherein the run length label indicates that the connected component is a text component when the number of transitions within a set of scanlines selected from scanlines across the connected component is less than a transition threshold.

15. The method of claim 14, wherein the set of scanlines selected from scanlines across the connected component comprises a set of horizontal scanlines and a set of vertical scanlines.

* * * * *